United States Patent [19]

Yamanaka

[11] Patent Number: 4,788,541
[45] Date of Patent: Nov. 29, 1988

[54] SIGNAL COMMUNICATION SYSTEM
[75] Inventor: Torao Yamanaka, Kobe, Japan
[73] Assignee: Mitsubishi Denki Kabushiki Kaisha, Tokyo, Japan
[21] Appl. No.: 11,431
[22] Filed: Jan. 29, 1987

Related U.S. Application Data
[63] Continuation of Ser. No. 583,275, Feb. 27, 1984, abandoned.

[30] Foreign Application Priority Data
Mar. 31, 1983 [JP] Japan .................................. 58-58234

[51] Int. Cl.$^4$ .............................................. H04Q 1/00
[52] U.S. Cl. ............................ 340/825.00; 340/825.03
[58] Field of Search ....................... 340/825, 825.03; 200/1 R, 5 A; 330/298; 335/106; 370/32; 455/78, 83; 307/12, 21-85

[56] References Cited
U.S. PATENT DOCUMENTS

| | | | |
|---|---|---|---|
| 3,040,271 | 6/1962 | Murphy et al. ................... | 307/38 X |
| 3,180,999 | 4/1965 | Kuykendall .................... | 200/1 R X |
| 3,227,820 | 1/1966 | Sorenson ........................ | 200/5 A |
| 3,264,418 | 8/1966 | Hagstrom ....................... | 200/1 R |
| 3,521,205 | 7/1970 | Vaccaro ......................... | 200/1 R X |
| 3,532,986 | 10/1970 | Gelushia et al. ............... | 455/78 |
| 4,197,498 | 4/1980 | Fukui et al. ................... | 455/78 X |
| 4,217,572 | 8/1980 | Giraud . | |
| 4,317,207 | 2/1982 | Fujimura et al. . | |

FOREIGN PATENT DOCUMENTS
2830050 1/1979 Fed. Rep. of Germany .

Primary Examiner—Ulysses Weldon
Attorney, Agent, or Firm—Lowe, Price, LeBlanc, Becker & Shur

[57] ABSTRACT

A signal communication system provided in a board device has a signal input/output terminal board having a plurality of input/output terminals. When a signal is communicated between two board devices, some of the input/output terminals serve as an input signal terminal and the remainder as an output signal terminal in accordance with the manual selection thereof.

17 Claims, 3 Drawing Sheets

SIGNAL COMMUNICATION SYSTEM

This application is a continuation of application Ser. No. 583,275, filed Feb. 27, 1984, now abandoned.

BACKGROUND OF THE INVENTION

1. Field of the Invention

This invention relates to a signal communication system, and more particularly to an improved signal communication system which conveys signals between power boards, control boards or other board devices (hereinafter referred to merely as "board devices") with a minimum of wires in a signal communication cable.

2. Description of the Prior Art

A typical example of conventional wiring between board devices of the above mentioned sort is illustrated in FIG. 1. In FIG. 1, there are shown two board devices generally designated the reference numbers 100 and 200. The two board devices 100 and 200 are connected through a communication cable 300. The board devices 100 and 200 each includes a terminal board 150 or 250. The communication cable 300 is connected between the terminal boards 150 and 250. The terminal boards 150 and 250 have terminals P, N, 1, 2 ... n wherein P and N are terminals for power supply. Power supply lines 400 include a positive line P and a negative line N. There are also shown relay coils $R_{11}$, $R_{12}$ and $R_{21}$ and their corresponding relay contacts $C_{11}$, $C_{12}$, $C_{21}$ and $C_{22}$. In the example of FIG. 1, power voltages P and N are fed from one of the board devices to the other through the cable 300.

The system as illustrated in FIG. 1 will operate as follows. Upon closure of the contact $C_{11}$ the coil $R_{21}$ is energized and upon closure of the contact $C_{21}$ the coil $R_{11}$ is energized. Furthermore, upon closure of the two contacts $C_{12}$ and $C_{22}$ the coil $R_{12}$ is placed into its energized state. In other words, the two board devices 100 and 200 are rendered operative in association with each other through the terminal boards 150 and 250.

The problems of the system as shown in FIG. 1 are that it requires a number of core wires in the connection cable 300 and becomes expensive correspondingly with increase in the distance between the two devices 100 and 200. One solution to those problems is a system of FIG. 2 by which to reduce the number of connection wires to a minimum.

FIG. 2 schematically illustrates an improved prior art wiring scheme between the board devices for further simplicity of connections between the devices as shown in FIG. 1 and minimization of the signal communication cable. In FIG. 2, components similar to those in FIG. 1 are represented by the same reference numbers. The board devices 100 and 200 include conventional signal communicators 10 and 20 for such wiring. The signal communicators 10 and 20 each are divided into a transmitter side and a receiver side. On the transmitter side of the signal communicator 10 signals are conveyed to a cable 310 in the signal communication cable 300 by way of an input signal terminal board 101, a signal converter circuit 102, a parallel-to-serial conversion logic circuit 103, a modulator 104 and a transmitter/receiver terminal board 120. The signals from the cable 310 are received through a transmitter/receiver terminal board 220, a demodulator 214, a serial-to-parallel conversion logic circuit 213, an output conversion circuit 212 and an output signal terminal board 211 on the receiver side of the signal communicator 20. In a likewise manner, signals are conveyed to a cable 320 in the signal communication cable 300 by way of an input signal terminal board 201, a signal conversion circuit 202, a parallel-to-serial conversion logic circuit 203, a modulator 204 and transmitter/receiver terminals 220 on the transmitter side of the signal communicator 20. The signals from the cable 320 are received through the transmitter/receiver terminal board 120, a demodulator 114, a serial-to-parallel conversion logic circuit 113, an output conversion circuit 112 and an output signal terminal board 111 on the receiver side of the signal communicator 10. The board devices 100 and 200 include individual power supply lines 401 and 402. The signal communicators 10 and 20, respectively, include power supply conversion circuits 131 and 231 which are led to power supply lines 401 and 402 via power terminal boards 130 and 230, for the purposes of generating voltages for logic operations.

Operation of the above described system will now be discussed. The input signal terminal board 101 in the board device 100 of FIG. 1 is fed with a positive power supply voltage $P_1$, depending upon whether or not the contacts $C_{11}$, $C_{12}$ and so forth are closed. The respective terminals of the input signal terminal board 101 are connected to respective input terminals of the signal conversion circuit 102. The signal conversion circuit 102, when its respective input terminals are connected to the power supply $P_1$ and supplied with DC 110V, for example, provides a logic "1" voltage (typically, DC 5V) at its output terminals corresponding to the respective input terminals. For those input terminals that are not connected to the power supply $P_1$ and remain open, the signal conversion circuit provides a logic "0" voltage (typically, DC 0V) at its output terminals corresponding to those input terminals. The logic signals at the respective output terminals of the signal conversion circuit 102 are fed to respective parallel input terminals of the parallel-to-serial conversion logic circuit 103 which in turn converts those signals into bit serial signals which are supplied to the modulator 104 after error detection codes such as parity codes have been added thereto. The modulator 104 modulates a carrier suitable for transmission with the input signals and sends out the same to the signals communication cable 300 via the transmitter/receiver terminal board 120. For example, the carrier is within an audio frequency range and frequency-modulated with the input signals. Typically, 2100 Hz sinewave signals are provided for the logic "0" signals and 1300 Hz sinewave signals for the logic "1" signals. This permits transmission to take place under the condition where signals being transmitted are immune to noise readily induced over the cable.

The modulated carrier conveyed over the signal communication cable 300 are then demodulated through the demodulator 214 into bit serial signals which in turn are converted through the serial-to-parallel conversion circuit 213 into parallel signals and fed to the output conversion circuit 212. Within the output conversion circuit 212, a voltage $P_2$ is applied to terminals of the serial-to-parallel conversion logic circuit 213 which correspond to logic "1" bits whereas terminals thereof which correspond to logic "0" bits are held in open state. The outputs of the output conversion circuit 212 are connected to the relay coils and contacts through the output signal terminal board 211. Signal transmission from the transmitter side of the signal communicator 20 to the receiver side of the signal communicator 10 takes place in the same manner as with signal transmission from the transmitter side of the signal communicator 10 to the receiver side of the signal communicator 20.

Therefore, should the contact $C_{11}$ be brought into a closed position, the power supply voltage $P_2$ is fed to the terminal 1 of the output signal terminal board 211, thus energizing the coil $R_{21}$. Upon closure of the contact $C_{21}$ the power supply voltage $P_1$ is supplied to the terminal 1 of the output signal terminal board 111 to energize $R_{11}$. Upon closure of the contact $C_{12}$ the power supply voltage $P_2$ is supplied to the terminal 2 of the output signal terminal board 211. If under this circumstance the contact $C_{22}$ is placed into a closed position, then the power supply voltage $P_2$ is fed to the terminal 2 of the input signal terminal board 201, permitting the supplying of the power supply votage $P_1$ to the terminal 2 of the output signal terminal board 111 and the energizing of the coil $R_{12}$.

With the above described system, it is possible to convey a number of signals through a minimum of communication lines (the lines 310 and 320 in the example of FIG. 2). However, in the device of FIG. 2, there are two kinds of terminal boards, the input signal terminal board and the output signal terminal board, which are separated from each other. The designer of the board devices is required to consider arrangement of various terminals, components and the like in the board deivces while taking into consideration the location of the terminal boards of the signal communicators settled in the board devices. In other words, a limitation is imposed that terminal arrangement in the board devices should be determined in association with the location of the signal communicators, presenting great difficulties in the design of the board devices. Another problem is that great difficulties are experienced in applying the system of FIG. 2 to the board devices designed without consideration of the foregoing limitation.

SUMMARY OF THE INVENTION

This invention is directed to a signal communication system for signal transmission between two board devices via a cable.

According to the present invention, there is provided a signal communication system which comprises a signal input/output terminal board for receiving from and providing signals therethrough to one of said two board devices therethrough, a transmitted section connected between said signal input/output terminal board and said cable for receiving output signals from said one board device and converting the same into desired logic signals of a bit serial format for supply to said cable, a receiver section connected between said signal input/output terminal board and said cable for receiving said logic signals from the other board device of the two via said cable and converting the same into signals of a desired format for supply to said input/output terminal board and means for enabling either said transmitter or receiver section.

Accordingly, it is the primary object of the present invention to provide a signal communication system which is capable of minimizing limitations on the design of arrangement of various components in board devices.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
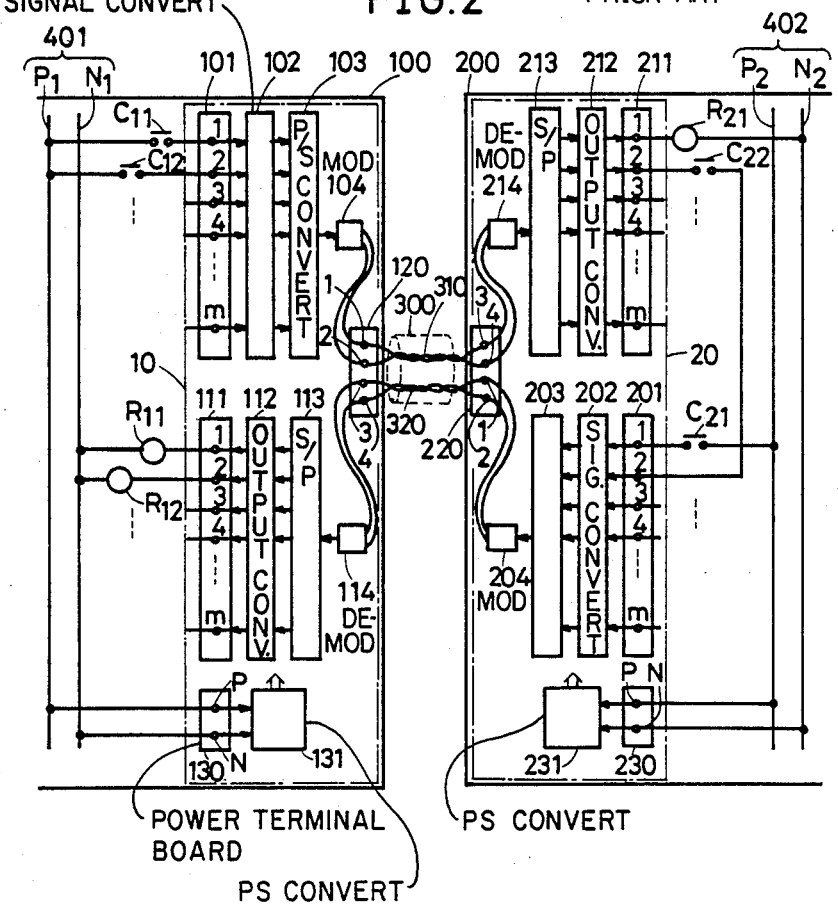
FIG. 2 shows an improved example of conventional wiring between board devices.
Figure 3:
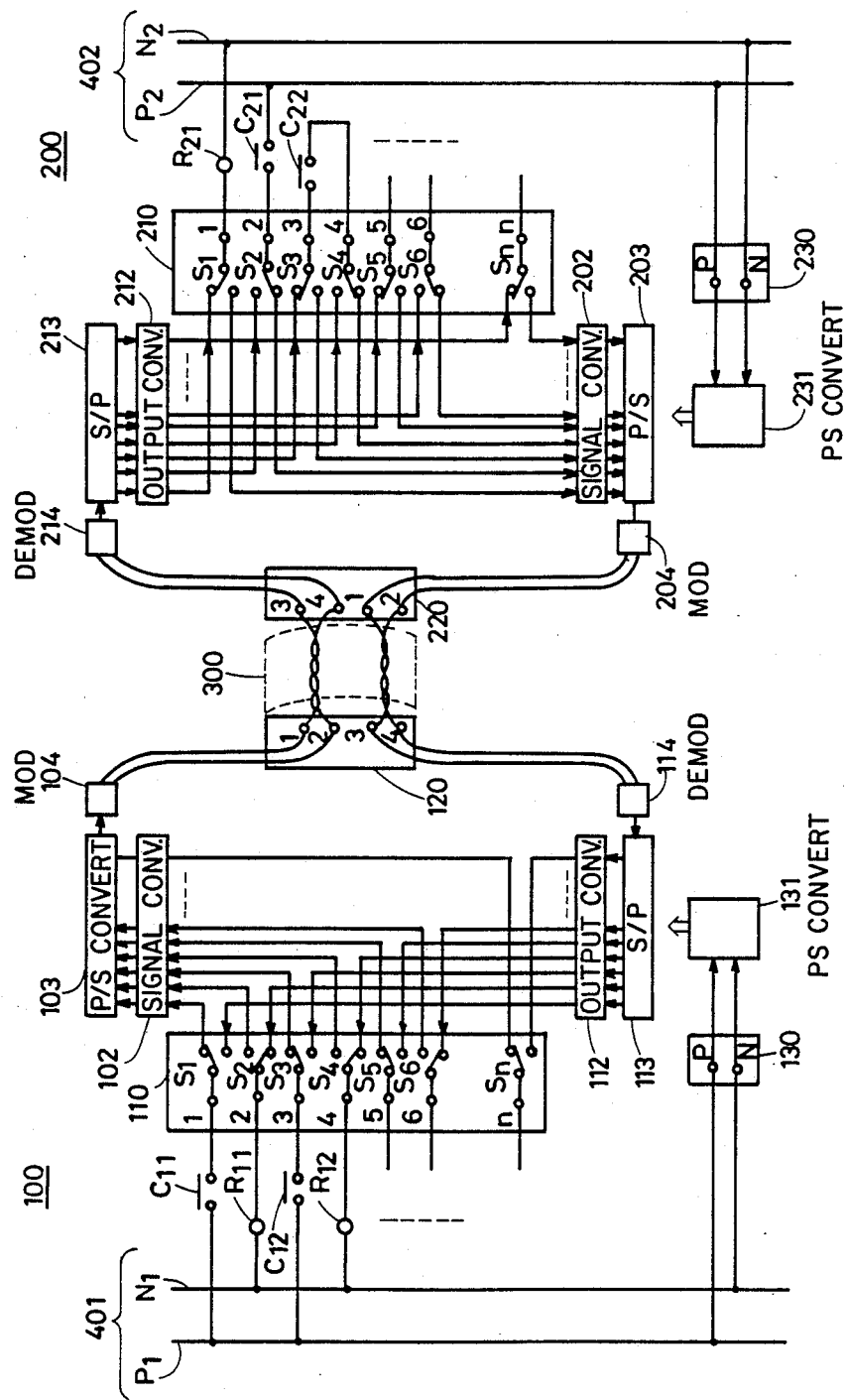
FIG. 3 is a wiring diagram of a preferred embodiment of the present invention.

FIG. 3 is a wiring diagram showing a preferred embodiment of the present invention, wherein components similar to those in FIG. 2 are identified by the same reference numbers and description of operation thereof omitted herein. In this alternative embodiment, a single input/output terminal board common to the respective signal communicators provides a substitute for the input signal terminal board and the output signal terminal board. In FIG. 3, a signal communicator in the board device 100 includes a transmitter path including an input/output signal terminal board 110, a signal conversion circuit 102, a parallel-to-serial conversion circuit 103, a modulator 104 and a transmitter/receiver terminal board 120, a receiver path including the transmitter/receiver terminal board 120, a demodulator 114, a serial-to-parallel conversion logic circuit 113, an output conversion circuit 112 and an input/output signal terminal board 110, as well as a power terminal board 130 and a power conversion circuit 131. A signal communicator in the board device 200 likewise includes a transmitter path including an input/output signal terminal board 210, a signal conversion circuit 202, a parallel-to-serial conversion logic circuit 203, a modulator 204 and a transmitter/receiver terminal board 220 and a receiver path including the transmitter/receiver terminal board 220, a demodulator 214, a serial-to-parallel conversion logic circuit 213, an output conversion circuit 212 and an input/output signal terminal board 210, as well as a power terminal board 230 and a power conversion circuit 231.

Figure 1:
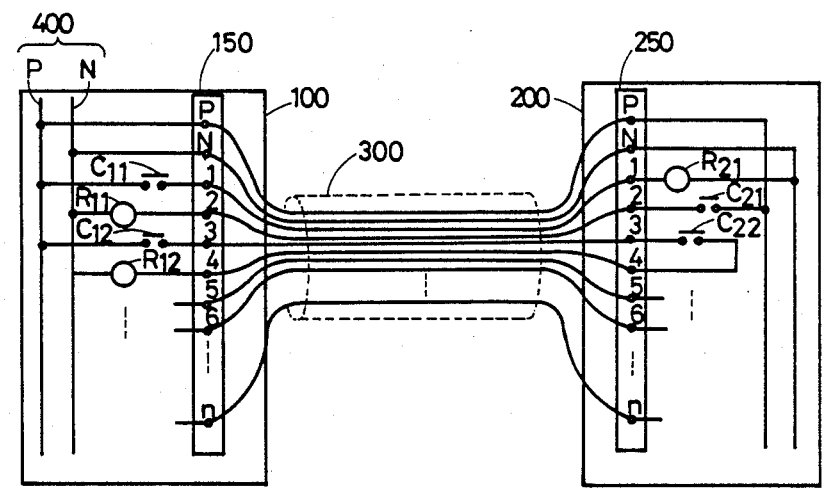
FIG. 1 shows an example of conventional wiring between board devices.

Referring to the input/output signal terminal board 110, the input/output terminals (respective terminals of relays and coils) of the board device 100 are sequentially connected on a predetermined order (for example, the order of alignment as shown in FIG. 1) to the respective ones of the terminals 1—n of the input/output signal terminal board 110. No particular consideration to signal inputs and outputs is necessary in this form of wiring. On the input/output signal terminal board 110 there are provided a changeover switch $S_1-S_n$, an output signal terminal and an input signal terminal for each of the input/output terminals. Through proper selection of the changeover switches the respective ones of the input/output terminals 1—n are used as input terminals or output terminals according to wiring in the board device. This is also the case with the input/output signal terminal board 210. Operation after the switches have been set is similar to that described with respect to FIG. 2.

As stated above, even though the terminals in the board device are connected to the signal communicator regardless of its input and output directions, it is easy to distinguish between the input side and output side in the foregoing embodiment through proper selection of the switches on the input/output signal terminal board. In the design of the input and output terminals in the board device, no attention should be drawn as to whether those terminals are for inputs or outputs, thus providing simplicity of the design of the board devices.

Figure 4:
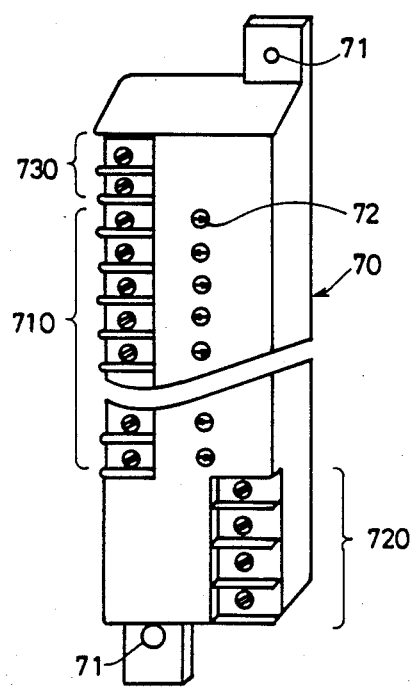
FIG. 4 is a perspective view showing the appearance of a signal communicator as illustrated in FIG. 3.

FIG. 4 is a perspective view showing the appearance of the signal communicator as discussed with respect to FIG. 3. A signal communicator 70 of a rectangular shape is provided at upper and lower corners with mounting plates having fixing holes 71. On a front panel of the signal communicator 70 there are mounted an input/output signal terminal board 710, a transmitter/receiver terminal board 720, a power terminal board 730 and switches 72 corresponding to respective ones of input/output signal terminals. The directions of arrows, for example, imprinted on the respective switches indicate the settings of those switches, which settings may be modified by means of a screwdriver.

It is evident that the above embodiment allows great flexibility in the design of terminal arrangement in the board devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal communication system for signal transmission between two contact and relay board devices via a cable, comprising:
   a signal input/output terminal board means operable for receiving signals from one of said two board devices signals therethrough and for providing signals to said one board device;
   a transmitter section means connected between said signal input/output terminal board means and said cable, said transmitter section means operable for receiving output signals from said one board device and for converting the same into desired logic signals of a bit serial format for supply to said cable for transmission to the other of said two board devices;
   a receiver section means connected between said signal input/output terminal board means and said cable, said receiver section means operable for receiving said logic signals from the other board device via said cable and for converting the same into signals of a desired format for supply to said signal input/output terminal board means for said one board device; and
   said signal input/output terminal board means including means for connecting terminals of said one of said two board devices either to said transmitter section means or to said receiver section means.

2. A signal communication system in accordance with claim 1 wherein
   said signal input/output terminal board means further includes a plurality of input/output terminals, and
   said means for connecting includes a changeover switch having an output signal terminal connected to said transmitter section means and an input signal terminal connected to said receiver section means, one output signal terminal and one input signal terminal provided for each of said input/output terminals of said signal input/output terminal board means, and means for selectively connecting each of said input/output terminals to a respective corresponding output signal terminal or input signal terminal.

3. A signal communication system in accordance with claim 2 which further comprises an outer container wherein said single input/output terminal board means and said means for selectively connecting are provided on a surface of said container.

4. A signal communication system in accordance with claim 2 wherein said means for selectively connecting comprises separate indicia means arranged for visually identifying the selection.

5. A signal communication system as recited in claim 1, wherein said signal input/output terminal board means includes: a plurality of input/output terminals,
   said input/output terminals connected to terminals of said one of said two board devices;
   a plurality of output terminals connected to provide said output signals fromm said one board device to said transmitter section means; and
   a plurality of input terminals connected to supply said converted signals from said receiver section means to said one board device.

6. A signal communication system as recited in claim 5, wherein said means for connecting is operable for connecting any of said input/output terminals of said input/output terminal board means either to one of said input terminals or one of said output terminals,
   said input/output terminal board means thus being operable for connecting individual terminals of said one of said two board devices either to said transmitter section means or to said receiver section means,
   thereby providing a flexible terminal interconnection wherein each input/output terminal of said input/output terminal board means connected to a terminal of said one board device is usable as either an input or an output terminal.

7. A signal communication system as recited in claim 6 wherein
   said means for connecting includes a plurality of changeover switches each having an output signal terminal forming an output terminal of said input/output terminal board means and connected to said transmitter section means, and an input signal terminal forming an input terminal of said input/output terminal board means and connected to said receiver section means, one output signal terminal and one input signal terminal provided for each of said input/output terminals of said signal input/output terminal board means, and means for selectively connecting each of said input/output terminals to a respective corresponding output signal terminal or input signal terminal.

8. A signal communication system as recited in claim 1, wherein each of said two contact and relay board devices includes a signal input/output terminal board means, a receiver section means and a transmitter section means.

9. A signal communication system as recited in claim 8 wherein each of the two contact and relay board devices is connected to respective separate power supply lines.

10. A signal communication system as recited in claim 9 wherein relay devices connected to one of said contact and relay board devices is connected to power supply lines thereof in response to signals transmitted by said transmitter section means of the other board device and received by said receiver section means of the one board device.

11. A signal communication system in accordance with claim 7 wherein
said transmitter means includes:
a signal conversion circuit means connected to an output terminal of said signal input/output terminal board means for receiving signals from said one board device and converting the received signals into logic signals;
a parallel-to-serial conversion logic circuit means connected to said signal conversion circuit for converting said logic signals into signals of a bit serial format; and
a modulator means for modulating a carrier with the output of said parallel-to-serial coversion logic circuit means, and wherein
said receiver section means includes:
a demodulator means for demodulating signals of the bit serial format conveyed on said modulated carrier from said other board device;
a serial-to-parallel conversion logic circuit means for converting bit serial signals from the output of said demodulator means into signals of a bit parallel format and providing logic outputs of individual bits; and
an output conversion circuit means connected to an input terminal of said input/output terminal board means for receiving said logic outputs from said serial-to-parallel conversion logic circuit means and for providing to said input terminal of said signal input/output terminal board means and to said one board device signals corresponding to said logic outputs applied thereto.

12. A signal communication system in accordance with claim 11 wherein said signal conversion circuit means includes a number of input terminals substantially equal to the number of input/output terminals of said input/output terminal board means, and said output conversion circuit means includes a number of output terminals substantially equal to the number of input/output terminals of said input/output terminal board means.

13. A signal communication system in accordance with claim 12, wherein said means for connecting includes selecting means for selecting respective ones of said input/output terminals of said input/output terminal board means for connection to respective input and output terminals of said signal conversion circuit means and said output conversion circuit means.

14. A signal communication system for serial signal transmission between two board devices via a cable, comprising:
a single signal input/output terminal board means for receiving therethrough signals from and providing therethrough signals to one of said two board devices;
transmitter means connected between said signal input/output terminal board means and the cable for receiving output signals from said one board device and converting the received output signals into logic signals of a bit serial format for supply to the cable for transmission to the other of said two board devices;
receiver means connected between said signal input/output terminal board means and the cable for receiving the logic signals from the other of said two board devices via the cable and converting the received logic signals into signals of a desired format for supply to said input/output terminal board means of said one board device;
terminal means having a plurality of input/output terminals associated with said input/output terminal board means, each of said input/output terminals connected to a terminal of said board device; and
means for selectably connecting said receiver means or said transmitter means to said terminal means and for selecting at least one of said input/output terminals of said terminal means to be either an output terminal or a input terminal,
thereby providing a flexible terminal interconnection for said one board device wherein each terminal of said one board device is connectable as either an input terminal connected to said receiver means or as an output terminal connected to said transmitter means.

15. A signal communication system as recited in claim 14 wherein
said selectably connecting means is operable for selecting any arbitrary corresponding interconnection arrangement among terminals of the two board devices.

16. A signal communication system as recited in claim 14, wherein said transmitter means includes a plurality of terminals and said receiver means includes a plurality of terminals, said selectably connecting means being operable for selecting any arbitrary interconnection arrangement between an arbitrary number of terminals of said transmitter means of said one board device through said other board device to a corresponding number of terminals of said receiver means of said one board device.

17. A signal communication system as recited in claim 14 wherein said means for selectably connecting is operable for selecting at least said one of said terminals of said terminal means to be an output terminal for connection to said transmitter means and for selecting at least another of said terminals of said terminal means to be an input terminal for connection to said receiver means simultaneously with connection of said one terminal to said transmitter means.

* * * * *